United States Patent
Santuka et al.

(10) Patent No.: US 10,212,039 B1
(45) Date of Patent: Feb. 19, 2019

(54) DETECTING NETWORK DEVICE CONFIGURATION ERRORS USING AUTHENTICATION REQUESTS FROM WIRELESS ENDPOINTS

(71) Applicant: Cisco Technology, Inc., San Jose, CA (US)

(72) Inventors: Vivek Santuka, Morrisville, NC (US); Aaron Troy Woland, Waxhaw, NC (US); Pok Sze Wong, Santa Clara, CA (US); Jesse Ryan Dubois, Durham, NC (US); Kannan Muthusamy, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 149 days.

(21) Appl. No.: 15/434,859

(22) Filed: Feb. 16, 2017

(51) Int. Cl.
  *H04L 12/24* (2006.01)
  *H04L 12/26* (2006.01)
  *H04W 12/06* (2009.01)
  *H04W 88/02* (2009.01)
  *H04W 84/12* (2009.01)
  *H04W 88/08* (2009.01)

(52) U.S. Cl.
  CPC ........ *H04L 41/0866* (2013.01); *H04L 41/085* (2013.01); *H04L 43/16* (2013.01); *H04W 12/06* (2013.01); *H04W 84/12* (2013.01); *H04W 88/08* (2013.01)

(58) Field of Classification Search
  CPC ............. H04L 41/0803; H04L 41/0806; H04L 41/0866; H04L 41/085; H04L 43/16; H04L 63/0892; H04W 12/06; H04W 12/08; H04W 88/08; H04W 4/02; H04W 48/16; H04W 48/18; H04W 48/08; H04W 84/12; H04W 84/045
  See application file for complete search history.

(56) References Cited

U.S. PATENT DOCUMENTS 8,005,030 B2  8/2011  Stephenson et al.
8,599,793 B2  12/2013  Thomson
(Continued)

OTHER PUBLICATIONS

"Cisco Security Information Event Management Deployment Guide", Revision: H1CY11, C07-608970-02, Jan. 2011, 19 pages.

*Primary Examiner* — Peter Chen
(74) *Attorney, Agent, or Firm* — Edell, Shapiro & Finnan, LLC (57) ABSTRACT

A management server communicates with an authentication server that authenticates endpoints, which are configured to connect wirelessly with access points (APs) controlled by respective ones of a plurality of controllers. Weights for the APs and the controllers are stored. Event logs detailing requests for authentication of the endpoints are received. For each request, roaming conditions for the endpoint that triggered the request are determined. Also, a respective weight of one or more of the AP connected with the endpoint and of the controller that controls the AP is increased by a respective amount depending on whether the roaming conditions are caused by the AP and the controller being improperly configured or properly configured. Identities of ones of the APs and the controllers having weights that exceed one or more weight thresholds each indicative of an improperly configured AP or controller are stored.

20 Claims, 7 Drawing Sheets

(56) References Cited

U.S. PATENT DOCUMENTS

| | | |
|---|---|---|
| 8,650,277 B2 | 2/2014 | Gentile et al. |
| 9,049,108 B2 * | 6/2015 | Ji .......................... H04L 41/065 |
| 2007/0206537 A1 * | 9/2007 | Cam-Winget ........ H04L 63/162 |
| | | 370/331 |
| 2008/0253314 A1 * | 10/2008 | Stephenson ........... H04W 24/08 |
| | | 370/326 |
| 2011/0213821 A1 | 9/2011 | Gentile et al. |
| 2016/0142394 A1 * | 5/2016 | Ullrich .................. H04W 4/043 |
| | | 726/7 |

* cited by examiner

| WC1 | WCW1 |
| AP1 | APW1 |
| AP2 | APW2 |
| WLC2 | WLCW2 |
| AP3 | APW3 |
| AP4 | APW4 |
| ⋮ | ⋮ |

DETECTING NETWORK DEVICE CONFIGURATION ERRORS USING AUTHENTICATION REQUESTS FROM WIRELESS ENDPOINTS

TECHNICAL FIELD

The present disclosure relates to detecting network device configuration errors.

BACKGROUND

Wireless endpoint devices may connect to wireless local area networks (WLANs) configured on access points (APs) and WLAN controllers (WLCs) that control the APs. When roaming/mobility is properly configured on the APs and the WLCs, the endpoint devices typically do not need to authenticate to an authentication server when the endpoint devices roam; however, when roaming/mobility is not properly configured on the APs and/or the WLCs, each roaming event typically results in a new authentication attempt, i.e., a re-authentication, to the authentication server. Such re-authentications may cause overloading of the authentication server and, in a sufficiently large network environment, scalability and resource problems. Detecting/locating roaming/mobility configuration problems on the APs and the WLCs and/or the cause of excessive re-authentication of the endpoint devices is time consuming and typically requires debugging of individual endpoint devices connected with the APs/WLCs, and usually involves querying end users to generate purposeful roaming events. Overall, this troubleshooting process may take days or even weeks, and is reactive in nature.

DESCRIPTION OF EXAMPLE EMBODIMENTS

Overview

A management server is configured to communicate with an authentication server. The authentication server is configured to authenticate endpoint devices which are configured to connect wirelessly with access points (APs) controlled by respective ones of a plurality of controllers. Individual adjustable weights for respective ones of the APs and of the controllers are stored. Event logs detailing requests for authentication of the endpoint devices are received from the authentication server. For each request, roaming conditions for the endpoint device that triggered the request are determined based on the request and a previous request for the endpoint device. Also, the respective weight of each of one or more of the AP connected with the endpoint device and of the controller that controls the AP is increased by a respective amount depending on whether the roaming conditions are caused by the AP and the controller being improperly configured to handle roaming of the endpoint device or properly configured to handle roaming of the endpoint device. Identities of ones of the APs and the controllers having weights that exceed one or more weight thresholds each indicative of an improperly configured AP or controller are stored.

Example Embodiments

Figure 1:
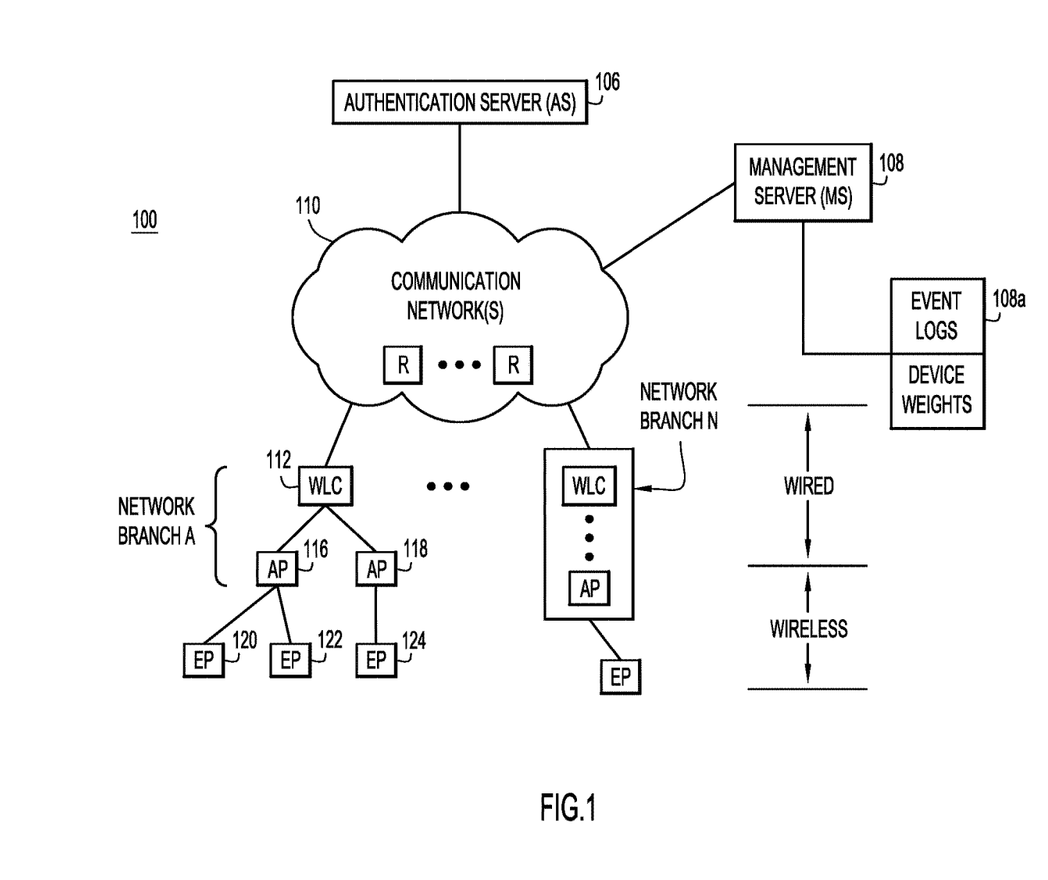
FIG. 1 is a block diagram of a network that supports embodiments for identifying configuration problems in network devices based on authentication requests from wireless endpoint devices, according to an example embodiment.

Referring first to FIG. 1, there is shown a block diagram of an example network 100 in which embodiments directed to identifying configuration problems in network devices based on authentication requests from endpoint devices may be implemented. Network 100 includes multiple network branches A-N, an authentication server (AS) 106, and a management server (MS) 108 all connected to, and able to communicate with each other over, a communication network 110. Communication network 110 may include one or more local area networks (LANs) and one or more wide area networks (WANs), such as the Internet. Communication network 110 also includes one or more routers and/or switches R to route traffic to and from the communication network.

Network branch A is representative of each of the network branches A-N and, therefore, the following description of network branch A shall suffice for the other network branches. Network branch A includes a wireless local area network (WLAN) controller (WLC) 112 and wireless APs 116 and 118, collectively referred to as "network devices." WLC 112 communicates with communication network 110 over a connection with one of routers/switches R, which may be wired a connection. WLC 112 (also referred to simply as an "AP controller" and a "controller") also communicates with and controls/manages wireless access points (APs) 116 and 118 over respective connection/links with the APs, which may also be wired connections. APs 116 and 118 provide wireless endpoint devices 120, 122, and 124 served by the APs with access to network 100. Wireless endpoint devices 120-124 (also referred to simply as "endpoints") may take on a variety of forms, including mobile phones (e.g., SmartPhones), tablet computers, laptop computers, desktop computers, video conference endpoints, smart cameras, printers, and the like.

Each of APs 116 and 118 may communicate wirelessly with endpoints 120-124 in one or more WLANs (not specifically shown in FIG. 1) configured on the APs and WLC 112. APs 116 and 118 are each configured with a wireless access control protocol to provide access to endpoints 120-124 over wireless access links in accordance with the protocol. In an example, the wireless access protocol may include one or more of the IEEE 802.11 protocols, although other wireless access protocols are possible, as would be appreciated by those of ordinary skill in the relevant arts having access to the description herein.

WLC 112 controls the functionality of APs 116 and 118 and routes data traffic (referred to as "traffic") associated with each AP to and from communication network 110. Such traffic includes data packets from an endpoint served by the AP and destined for the Internet, or data packets from the Internet destined for the endpoint. A Lightweight Access Point Protocol (LWAPP) may be used between each of APs 116 and 118 and WLC 112 to enable the WLC to perform the aforementioned control and traffic routing functions with respect to each AP. That is, WLC 112 and APs 116, 118 may be configured to support the functionality of LWAPP. It is to be understood that other similar/suitable wireless network control protocols are possible, as would be appreciated by those of ordinary skill in the relevant arts having access to the description herein.

Authentication server 106 receives authentication requests (also referred to as "requests for authentication" and more simply as "requests") for/triggered by the endpoints (e.g., endpoints 120-124) and authenticates the endpoints responsive to the requests, as is known. It is understood that network 100 is shown by way of example in FIG. 1, and the network may include many thousands of APs and WLCs serving many thousands of endpoints, which trigger authentication requests to be handled by authentication server 106. Each request includes identifiers of the endpoint that triggered the request, the AP connected to the endpoint, and the WLC that controls the AP (and that is connected with the AP). The identifiers may include Media Access Control (MAC) addresses and or Internet Protocol (IP) addresses. Each request, or information related to the request, may also include a profile of the endpoint that triggered (i.e., is the target of) the request. The profile may include a classification of the endpoint device, such as "mobile" or "stationary." Also, authentication server 106 may include functionality to derive the classification of the endpoints based on communication with the endpoints. Authentication server 106 generates event logs for the authentication requests, collectively referred to as "authentication/authorization events," and forwards the event logs to management server 108.

Management server 108 performs techniques presented herein to identify ones of the APs and WLCs that are not properly configured, especially with regard to handling roaming of the endpoints, based on the event logs that detail the requests for authentication. Management server 108 receives the event logs from authentication server 106 and stores the event logs in a database 108a accessible to the management server. Management server 108 also stores in database 108a individual, adjustable weights for/assigned to the APs and to the WLCs in network 100. Management server 108 manipulates/adjusts the individual weights over time based on information derived from the event logs, to identify/highlight the APs and the WLCs that are likely to be improperly configured for roaming/mobility as compared to the APs and the WLCs that are likely to be properly configured. Basically, management server 108 manipulates the individual weights based on the event logs so that the weights indicate whether the APs or WLCs to which the weights are assigned are improperly (or properly) configured, as will be described more fully below. In FIG. 1, management server 108 is shown separately from authentication server 106 by way of example only. In an alternative arrangement, the functions performed by management server 108 as described herein may be implemented in whole or in part on authentication server 106.

As mentioned above, endpoints 120-124 may include (i) stationary devices (e.g., desktop computers and printers), and/or (ii) mobile devices (e.g., SmartPhones) that may roam over geographical areas, and thus across/between different APs, different WLCs, and different WLANs in network 100 (e.g., across branches A-N). Briefly, when a given endpoint initially accesses/connects to a WLAN via an AP that is in wireless range of the endpoint, the access causes/triggers the WLC that controls the AP to which the endpoint is connected to send a request for authentication of the endpoint to authentication server 106. Responsive to the authentication request, authentication server 106 authenticates the endpoint.

If the endpoint is a mobile device, over time, the mobile endpoint may roam between different APs and different WLCs. If the different APs and the different WLCs across which the mobile endpoint roams are each properly configured to handle the roaming/mobility, e.g., the APs and WLCs are properly configured with the wireless access protocol(s) and LWAPP to handle roaming/mobility, the roaming should not normally trigger re-authentication of the mobile endpoint. In contrast, if any of the different APs and the different WLCs are not properly configured to handle roaming, the roaming is likely to trigger one or more unnecessary re-authentications of the mobile endpoint. Also, if the endpoint is a stationary device that does not roam over time, such as a wireless printer, and if the AP to which the stationary endpoint initially connects (and other APs in the vicinity of the endpoint—e.g., in range of the endpoint device) and the WLC which controls that AP are configured properly, unnecessary re-authentication of the stationary endpoint normally should not be triggered. In contrast, if any of the aforementioned devices are improperly configured, unnecessary re-authentication will likely be triggered.

Accordingly, management server 108 identifies/diagnoses improperly configured ones of the APs (e.g., APs 116, 118) and the WLCs (e.g., WLC 112) in network 100, based on the authentication/re-authentications as seen at authentication server 106 and detailed in the event logs. The embodiments leverage the fact that the APs and the WLCs in network 100 that are properly configured, especially with regard to the handling of roaming of endpoints, tend not to trigger unnecessary re-authentications of either mobile or stationary endpoints, while APs and WLCs that are improperly configured tend to trigger unnecessary re-authentications. Because authentication server 106 receives from the various endpoints all of the authentication/re-authentication requests, and because the requests identify the endpoints that originate/trigger the requests as well as the APs connected with the endpoints and the WLCs that control the APs, the requests serve as a unique focal point from which improperly configured ones of the APs and the WLCs may be determined.

Figure 2:
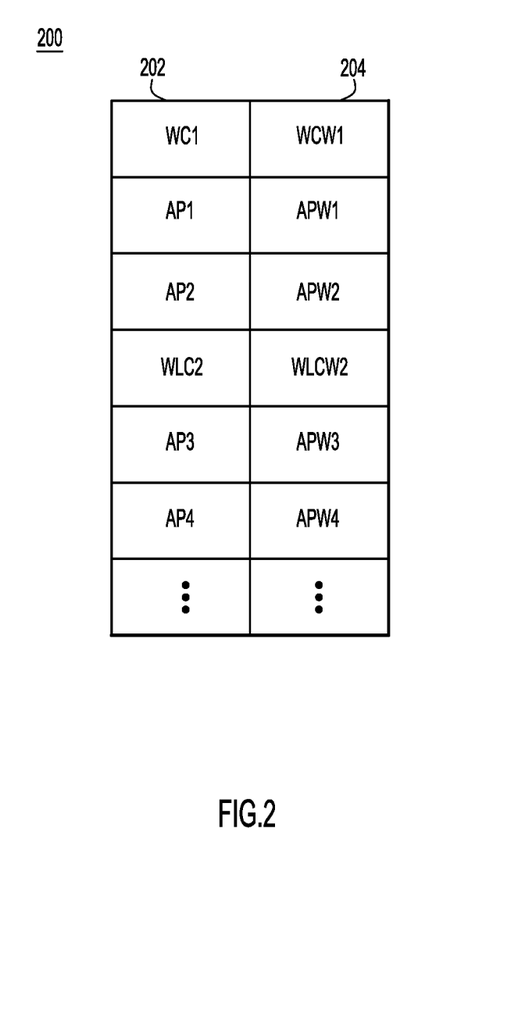
FIG. 2 is an illustration of a table of access point (AP) and wireless local area network (WLAN) controller (WLC) weights that are manipulated to determine the network device configuration problems, according to an example embodiment.

With reference to FIG. 2, there is an illustration of an example table 200 of AP and WLC weights stored in database 108a. A first column 202 stores identifiers of the various APs and WLCs (e.g., AP1, WLC1), which may be by device address or other identifier. A second column 204 stores individual weights (e.g., APW1, WLCW1) corresponding to the APs/WLCs identified in first column 202. In the example of FIG. 2, table 200 lists under each identified WLC the group of one or more APs connected to and controlled/managed by that WLC. For example, WLC WLC1 controls APs AP1 and AP2, as indicated in table 200, and so on.

Figure 3:
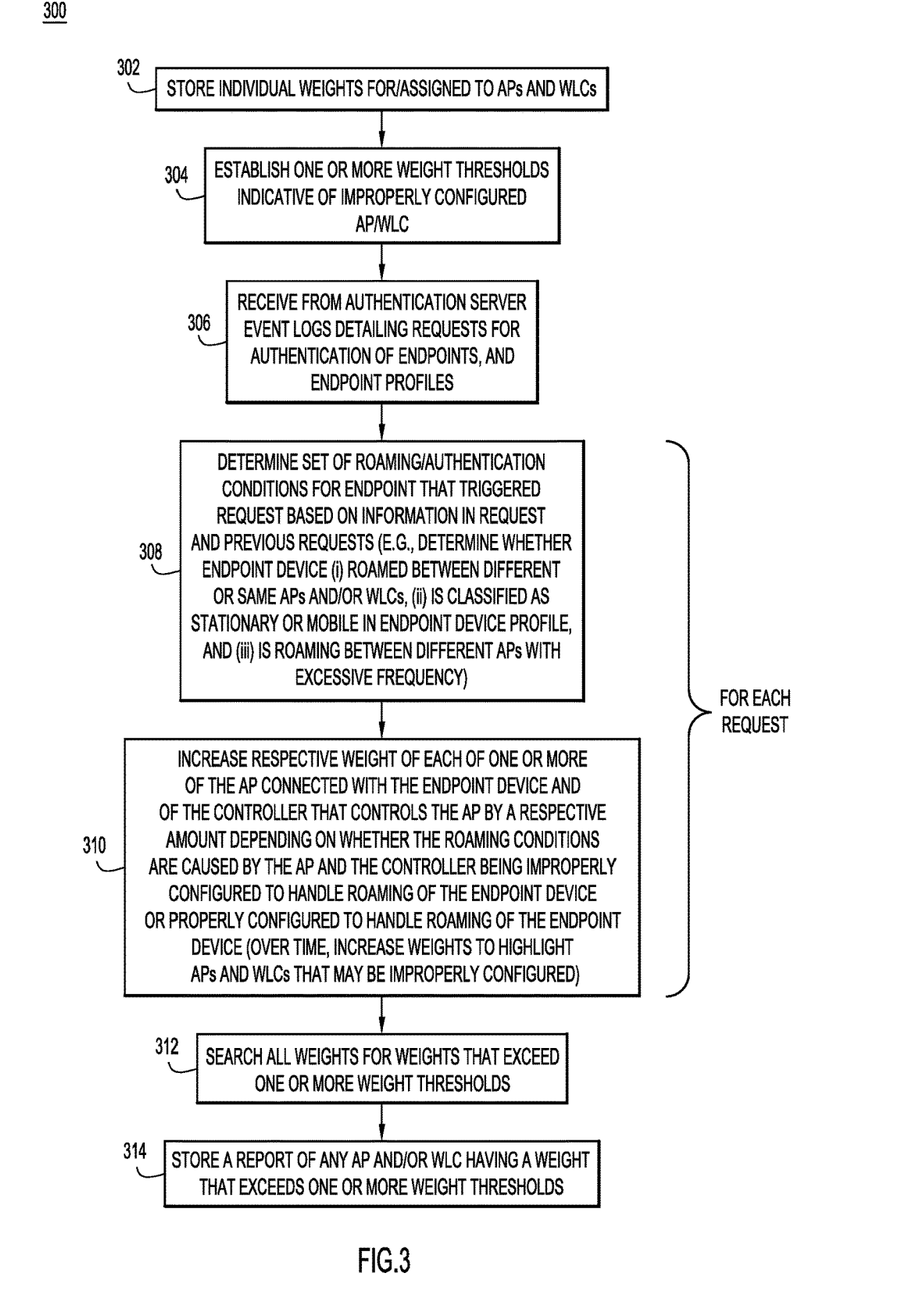
FIG. 3 is a high-level flowchart of a method of identifying improperly configured APs and WLCs in the network based on authentication/re-authentication events triggered by the wireless endpoint devices, according to an example embodiment.

With reference to FIG. 3, there is a high-level flowchart of an example method 300 of identifying improperly configured APs and WLCs in network 100 based on authentication/re-authentication requests/events triggered by endpoints, performed by management server 108. More generally, method 300 identifies/highlights problems with individual network devices (e.g., APs 116, 118, and WLC 112, and so on) and groups of network devices in network 100, as evidenced by authentication events seen from the perspective of authentication sever 106.

At 302, management server 108 stores to database 108a the individual adjustable weights for/assigned to each of the APs and each of the WLCs of network 100. Management server 108 initializes/sets the weights equal to zero.

At 304, management server 108 performs an a priori thresholding operation with respect to the weights. The thresholding operation determines/establishes one or more weight thresholds above which an improperly configured network device, such as an AP or a WLC, is indicated. That is, if a weight assigned to an AP or a WLC in network 100 exceeds the one or more weight thresholds, that AP/WLC is indicated as likely being improperly configured. The weight thresholds may include a single weight threshold that is to be compared against both the AP weights and the WLC weights, or a first weight threshold for the AP weights and a second weight threshold for the WLC weights. In another arrangement, management server 108 may be provisioned with the one or more weights thresholds.

At 306, over a period of time, management server 108 receives event logs from authentication server 106. The event logs include requests for authentication/re-authentication of endpoints (e.g., endpoints 120-124) and include the information described above, i.e., they identify the endpoints, the APs connected with the endpoints, the WLCs that control the APs, and optionally endpoint profiles.

At 308, management server 108 determines roaming/authentication conditions (also referred to simply as "roaming conditions" or "conditions") for the endpoints based on the requests originated/triggered by the endpoints. More specifically, for each request (which may be referred to as the "current request"), management server 308 determines a set of conditions for the endpoint that triggered the request (i.e., the endpoint to which the request pertains) based on the information in the request and information in one or more previous requests triggered by that endpoint. For example, management server 108 determines:

a. Whether the endpoint roamed between/across different APs or is re-authenticating to the same AP (i.e., is re-authenticating through the same AP to which the client device was initially connected), and/or roamed between APs controlled by different WLCs (referred to as roaming between WLCs) or is re-authenticating via the same WLC;

b. A classification of the client device as either "stationary" or "mobile" (i.e., non-stationary) in the profile of the endpoint. This may be determined based on information in the request, other information available in the event logs, or using any other technique to profile the endpoint; and c. An AP switch or "flap" frequency with which the endpoint has roamed/switched between different APs, and whether the frequency exceeds a predetermined frequency threshold (e.g., more than 5 AP switches during a period of 10 seconds), which would indicate excessive roaming.

In support of operation 308, management server 108 may maintain for each endpoint a respective history of requests from the endpoint that is stored in database 108a. The history for each endpoint includes time-ordered entries for respective ones of the requests from/triggered by the endpoint. The entries may be stored in a memory "stack" of entries. Each entry in the history is timestamped/time-tagged with a time when the respective request was received by the authentication server 106, and includes identities of the respective AP connected with the endpoint and the respective WLC that controls the AP. Thus, in operation 308, management device 108 may determine the roaming/authentication conditions for the endpoint based on the information in the (current) request and the respective history of previous requests maintained for that endpoint.

At 310, management server 108 increases the weights of the APs and of the WLCs by varying amounts based on the determined conditions in order to highlight ones of the APs and the WLCs that are most likely improperly configured to handle roaming/mobility relative to ones of the APs and the WLCs that are most likely properly configured. More specifically, in operation 310, for each request, management server 108 increases the respective weight of each of one or more of the AP connected with the endpoint device and of the controller that controls the AP by a respective amount depending on whether the roaming conditions are caused by the AP and the controller being improperly configured to handle roaming of the endpoint device or properly configured to handle roaming of the endpoint device. A goal of iteratively repeating operations 308 and 310 many times for many requests over time is to increase the weights of "problem" APs/WLCs more than the weights of APs/WLCs that are not considered to be problem APs/WLCs. Example details of determine operation 308 and increase operation 310 are discussed below in connection with FIG. 5.

At 312, management server 108 determines ones of the APs and of the WLCs having weights that exceed the one or more weight thresholds indicative of an improperly configured AP or WLC. For example, management server 108 may search all of the weights, comparing the searched weights to the one or more weight thresholds, to find the ones of the weights that exceed the one or more thresholds. The searching may compare all of the weights to the same weight threshold. Alternatively, the searching may compare weights assigned to the APs to the first weight threshold for the APs (mentioned above in connection with operation 304), and compare weights assigned to WLCs to the second weight threshold for the WLC (also mentioned above in connection with operation 304).

At 314, management server 108 generates and stores a report that identifies any APs and WLCs that have weights found to exceed the one or more weight thresholds in operation 312. Management server 108 may identify the APs and/or WLCs by their IP/MAC addresses, locations, WLANs to which the APs and/or WLCs belong, or any other suitable identifying information. The reports may also include heat maps of identified network devices that do not have roaming configured properly. Management sever 108 may display the report, store it in a file for subsequent access, make it accessible via an Application Programming Interface (API), and so on.

Operations 312 and 314 may be performed each time operations 308 and 310 are performed, or may be performed periodically only after operations 308 and 310 have been performed many times.

Returning to operation 304, there are many different techniques that may be used to establish the one or more weight thresholds. One technique includes the following operations:

a. Each of the weights is set to zero;
b. While network 100 is operating normally, operations similar to operations 306, 308, and 310 are performed for a predetermined time period, e.g., several hours, to generally increase the weights over the predetermined time period;
c. After the predetermined time period, the weights are searched for outliers, especially for outliers that are significantly larger than the majority of the weights. The outliers may represent or arise from APs and/or WLCs that are improperly configured. Any known technique to find the outliers may be used, such as plotting the weights in a scatter plot and then identifying the outliers on the scatter plot according to a threshold criterion that identifiers the outliers;
d. The outliers found in the searching are removed from the weights, leaving remaining weights.
e. The one or more weight thresholds are determined as a function of the remaining weights, such as an average of the remaining weights, or any other function that establishes a baseline weight threshold. In addition, the weights for the APs and the weights for the WLCs may be processed separately in (c), (d), and (e) to produce separate weight thresholds for the APs and the WLCs.

Figure 4:
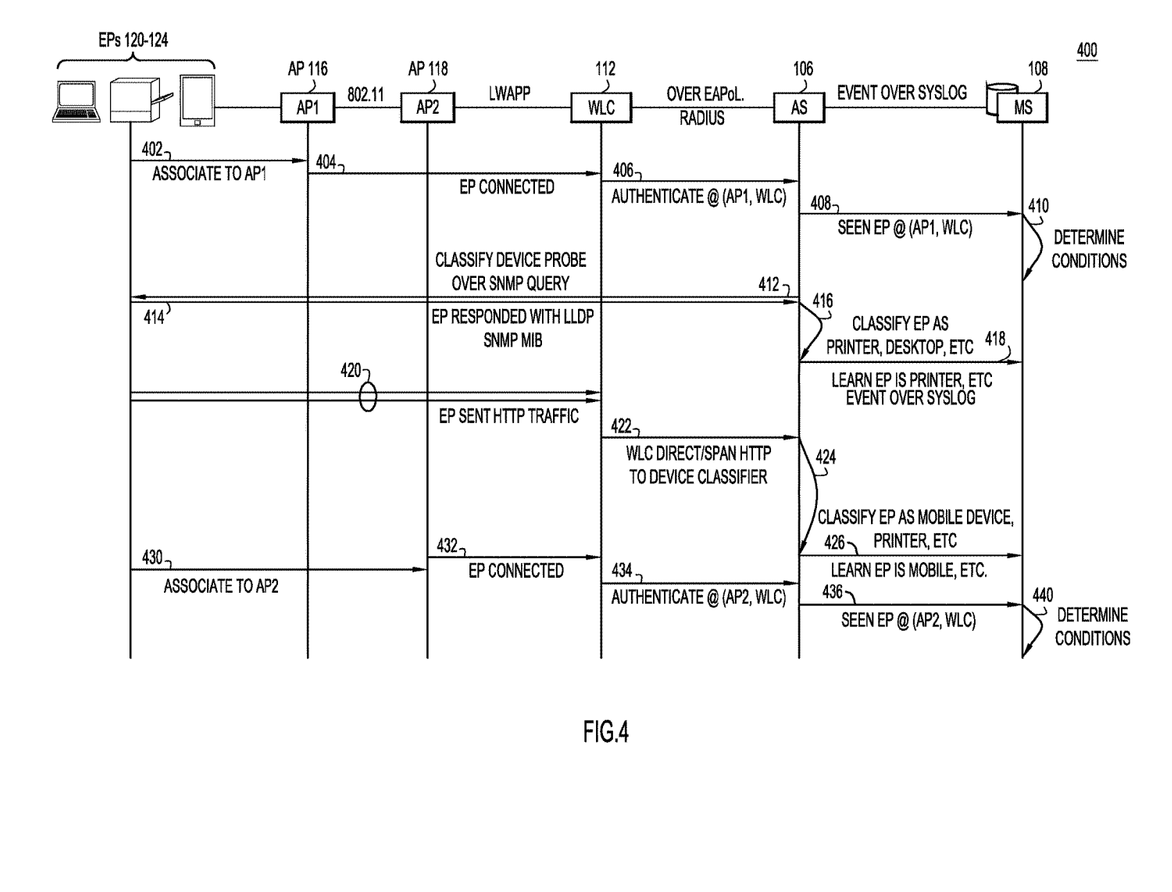
FIG. 4 is an example thread/transaction diagram that shows transactions, messages, and/or operations in the network in connection with performance of the method of FIG. 3, according to an example embodiment.

With reference to FIG. 4, there is an example thread/transaction diagram 400 that shows certain transactions, message, and/or operations performed in network 100 in connection with method 300. In the example of FIG. 4, endpoints 120-124 may include a wireless printer, a desktop computer, and a mobile phone, for example, and APs 116, 118 are denoted AP1, AP2, respectively.

Events 402-406 trigger authentication of one of endpoints (EPs) 120-124 (i.e., the target endpoint), as follows. Initially, at 402, the one of endpoints 120-124 sends a wireless access request to AP1 to associate with AP1. At 404, the endpoint connects with WLC 112 through AP1. In response, at 406, WLC 112 sends a request for authentication of the endpoint to AS 106 on behalf of the endpoint. Thus, through events at 402-406, the endpoint is said to have caused or triggered the request for authentication. The request for authentication identifies the endpoint, AP1, and WLC 112 connected with, and that controls, AP1. Responsive to the request for authentication, AS 106 authenticates the endpoint, and at 408 sends related event logs to management server 108 using, for example, the syslog protocol.

At 410, management server 108 determines as many of the roaming/authentication conditions as possible based on the information in the event logs.

At next transactions 412-424, a device classifier (not specifically shown in FIG. 4) hosted on AS 106 classifies a profile of the endpoint, e.g., classifies the endpoint as either stationary or mobile, as is now described.

At 412, the device classifier sends a "classify device probe" query, such as a Simple Network Management Protocol (SNMP) query, to the endpoint via WLC 112 and AP1. The query solicits profile information from the endpoint. At 414, responsive to the query, the endpoint may send or indicate to the device classifier hosted on AS 106 an endpoint profile. Depending on the type of endpoint (e.g., printer, computer, phone, etc.), the response sent by the endpoint may advertise the profile in accordance with any number of know protocols, such as the Link Layer Discovery Protocol (LLDP), SNMP, and the management information base (MIB), as is known. At 416, the device classifier classifies the type of endpoint, e.g., as a printer, a mobile device, and so on, based on the response at 414. At 418, the device classifier sends the classified type to management server 108 in an event log.

At 420, the endpoint may also send Hypertext Transfer Protocol (HTTP) traffic to WLC 112, which, at 422, directs the HTTP traffic to the device classifier. At 424, the device classifier classifies the type of endpoint based on information conveyed by the HTTP traffic. At 426, the device classifier sends the classified type to management server 108 in an event log.

At 430, the endpoint associates with AP2, indicating a roam from AP1 to AP2, i.e., across different APs. This triggers transactions 432, 434, and 436 similar to earlier transactions 404, 406, and 408, respectively. Transaction 434 initiates a re-authentication of the endpoint.

At 440, management server 108 determines roaming/authentication conditions based on the request forwarded in the event logs at 436 and the endpoint profile learned at 418 and/or 426.

Figure 5:
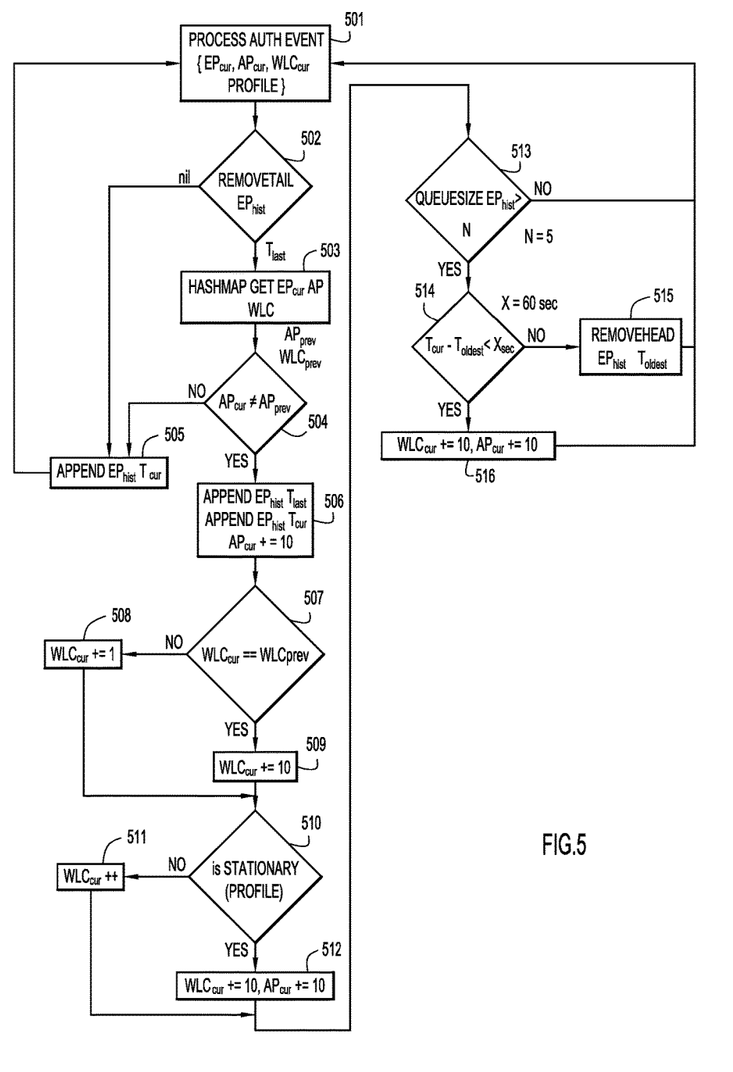
FIG. 5 shows operations expanding on determining and increasing operations of the method of FIG. 3, according to an example embodiment.

With reference to FIG. 5, there are shown operations 501-516 expanding on the determining and the increasing operations 308 and 310 of method 300. Operations 501-516 process a single "current" request for authentication of an endpoint that triggered the request (i.e. the endpoint to which the request pertains). The current request is referred to and/represented by a current authorization event or "Auth Event" in the event logs from authentication server 106. The current Auth Event references the endpoint that triggered the current request, the AP connected with the endpoint, the WLC connected to and that controls the AP, and the profile of the endpoint as the current endpoint ($EP_{cur}$), the current AP ($AP_{cur}$), the current WLC ($WLC_{cur}$), and the Profile, respectively. More succinctly, the current Auth Event is represented as a tuple $\{EP_{cur}, AP_{cur}, WLC_{cur}, \text{Profile}\}$. It is also assumed that operations 501-516 operate on and maintain a history of authorization events (referred to simply as "Auth Events") for the currently referenced endpoint ($EP_{cur}$). The history is implemented as a stack of time-ordered, timestamped (or time-tagged) Auth Events, each representing a corresponding request of authentication for the current endpoint.

At 501, MS 108 reads from the event logs (which may be either live/real-time or recorded) a newest/current Auth Event carrying $\{EP_{cur}, AP_{cur}, WLC_{cur}, \text{Profile}\}$, representing the MAC of the current endpoint, the MAC/IP of the current AP, the IP of the current WLC, and the device profile of the current endpoint (in this case, as profiled by the device profiler of AS 106). Flow proceeds to 502.

At 502, MS 108 dequeues from the (endpoint) history a last timestamp recorded $T_{last}$, which is a last time the current endpoint had an Auth Event recorded (entered in the history). If there is no history, the current endpoint is new, i.e., this is the first time the current endpoint has been seen in the event logs, and flow proceeds to 505. On the other hand, if there is history, flow proceeds from 502 to 503.

At 503, since the endpoint has history, MS 108 uses the MAC address for the current EP ($EP_{cur}$) as a key to retrieve the last seen AP ($AP_{prev}$) and the last seen WLC ($WLC_{prev}$) for the endpoint. Flow proceeds to 504.

At 504, MS 108 determines if the last seen AP ($AP_{prev}$) is the same as the current AP ($AP_{cur}$) in the most recent Auth Event. If they are the same, then there is no roaming between APs, and flow proceeds to 505 (and then returns to read a next Auth Event). If they are not the same, then there is roaming between different APs (i.e., layer 2 (L2) roaming), and flow proceeds to 506.

At 505, MS 108 queues the current timestamp $T_{cur}$ as the last record in the history so that the last observation time of the endpoint reflects the latest timestamp, which is used to establish a frequency of endpoint roaming, i.e., for roam frequency determination (see 513-514 below). From 505, flow returns to read a next Auth Event.

At 506, MS 108 re-queues the original history record $T_{last}$, and then queues the current timestamp $T_{cur}$. Queuing these two timestamps records both the original observed time of the endpoint pre-roaming, as well as the latest timestamp of the endpoint post-roaming. These timestamps are used to establish the frequency of endpoint roaming. MS 108 increments (i.e., increases) the weight of the current AP by 10. Flow proceeds to 507.

At 507, MS 108 determines if the last seen WLC (WLC$_{prev}$) is the same as the current WLC (WLC$_{cur}$). If they are not the same, there is roaming between APs controlled by different WLCs (i.e., L3 roaming), and flow proceeds to 508, where MS 108 increments the weight for the current WLC by 1, then flow proceeds to 510.

If MS 108 determines that the last seen WLC is the same as the current WLC, then there is no roaming between WLCs (i.e., no L3 roaming), and flow proceeds to 509, where MS 108 increments the weight of the current WLC by 10, then flow proceeds to 510.

At 510, MS 108 determines if the endpoint is profiled not to be a stationary device (i.e., is mobile). If this is the case, flow proceeds to 511, where MS 108 increments the weight of the current WLC by 1, then flow proceeds to 513. If MS 108 determines that the endpoint is profiled to be a stationary device, flow proceeds to 512, where MS 108 increments the weight of the current WLC by 10 and also the weight of the current AP by 10, then flow proceeds to 513; this highlights an assumption that roaming of a stationary device is likely due to a configuration error.

At 513, MS 108 determines if the history shows/indicates less than a predetermined number (e.g., 5) of AP switches and, if so, flow returns to read a next Auth Event. If not, flow proceeds to 514.

At 514, MS 108 determines if more than a predetermined time period (e.g., 60 seconds) has elapsed since the first (i.e., oldest) record in history. If so, then a predetermined excessive roaming threshold has not been met, and flow proceeds to 515. At 515, MS 108 discards the first/oldest record in the history so that the history is a rolling or sliding history over time, and then flow returns to read the next Auth Event.

On the other hand, if no more than 60 seconds has elapsed since the first/oldest record in the history, then the excessive roaming threshold has been met, and flow proceeds to 516, where MS 108 increments the weight of the current WLC by 10 and the weight of the current AP by 10, then flow returns to read the next Auth Event; this highlights an assumption that the excessive frequency of roaming is likely due to a configuration error.

Operations 513-516 essentially determine from the history a frequency (referred to above as a "roaming frequency") with which the endpoint has switched between different APs, and whether the frequency (i) exceeds a frequency threshold (in which case, increment weights for current AP and WLC by 10), or (ii) does not exceed the frequency threshold (in which case do not increment the weights).

Figure 6A:
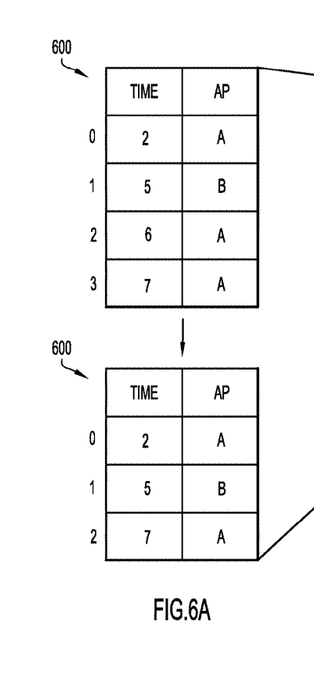
FIGS. 6A and 6B are illustrations of a history stack for an endpoint device that is maintained and manipulated by the operations of FIG. 5, according to an example embodiment.

With reference to FIG. 6A, there are illustrations of an example history stack 600 for the current endpoint described above generated by repeated iterations through operations 501-516 for a series of Auth Events. At the top of FIG. 6A, stack 600 includes four time-ordered entries 0-3 having respective timestamps 2, 5, 6, and 7 corresponding to APs identified as A, B, A, and A. Because there is no AP switch (i.e., "flap") from entry 2 to entry 3 (i.e., the AP is the same for both APs–AP=A for both), operations 501-516 effectively collapse stack 600 shown at the top of FIG. 6A to a smaller stack shown at the bottom of FIG. 6A. That is, "pop" and "push" of operations 501-516 effectively merge the third and fourth rows in favor of the fourth row.

Figure 6B:
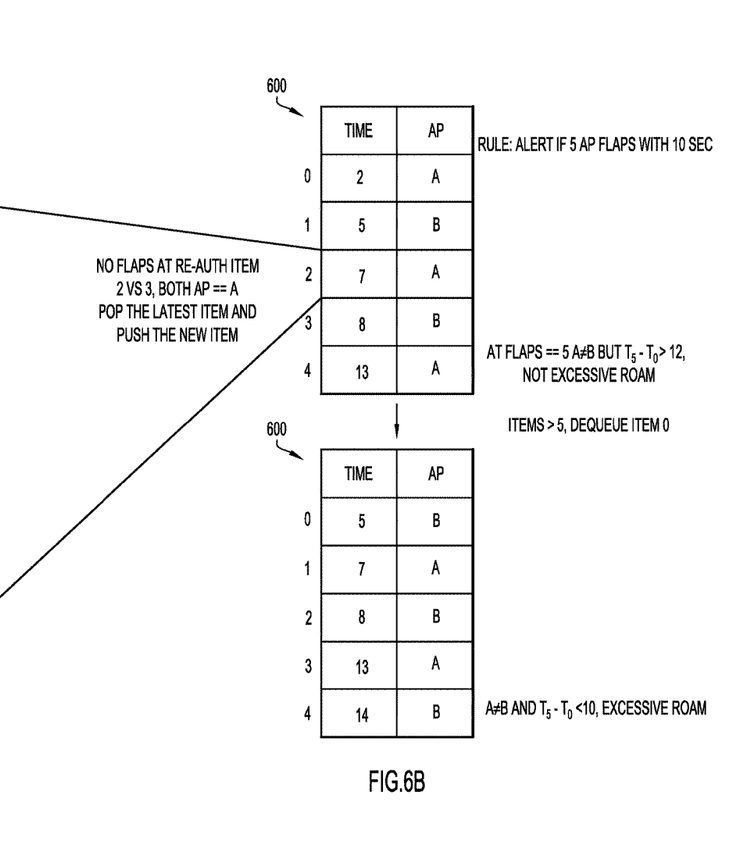

With reference to FIG. 6B, there are further illustrations of history stack 600 for the current endpoint generated by further iterations through operations 501-516 for a series of Auth Events. At the top of FIG. 6B, stack 600 includes five time-ordered entries 0-4 having respective timestamps 2, 5, 7, 8, and 13 corresponding to APs identified as A, B, A, B, and A. Assuming a sixth Auth Event arrives having a time T5 and indicating a new AP that is not B (i.e., 5 flaps), the stack will not indicate excessive roaming events even though 5 AP switches have occurred because the elapsed time will be greater than 10 seconds. Operations 501-516 dequeue oldest Auth Event 0 from stack 600 at the top of FIG. 6B.

At the bottom of FIG. 6B, stack 600 includes five time-ordered entries 0-4 having respective timestamps 5, 7, 8, 13, and 14 (since the oldest Auth Even is dequeued) corresponding to APs identified as B, A, B, A, and B. In this case, the stack indicates excessive roaming, i.e., 5 AP switches in less than 10 seconds.

As described above, network devices that are improperly configured may be found in a search for the weights of the APs and the WLC that exceed one or more weight thresholds. Other searching/thresholding functions may be used. For example, a cost function may be based on a profile, a WLC roam, an IP address of an endpoint device indicative of an AP roam, and a frequency of authentication attempts (given by a number of times/duration), as follows:

$$X = Profile * WLC * IP * (\text{No of times/Time in seconds}),$$
where:

a. Profile=If a stationary device (such as desktop/printer) then 10 else 1;
b. WLC=if roaming within same WLC=10, if roaming across WLCs=1;
c. End Point IP=If same IP (L2 roaming)=then 10, if different IP (L3 roaming)=1;
d. No of times=The number of authentication attempts where AP changes;
e. Time—In seconds the said number of roaming happened; and
f. X—The value that will be added to the cumulative X values of weights for a WLC and an AP so that network devices with higher values indicate a problem.

The equation for X "penalizes" authentications where proper roaming configuration should have prevented re-authentication.

For example, a desktop re-authenticating (across different APs) 5 times within 60 seconds within the same WLC and retaining the same IP address would have a value of:

$$10 \times 10 \times 10 \times (5/60) = 83.3.$$

In the above example, a desktop is not supposed to roam, so the equation shows that problem with a higher value.

A mobile device re-authenticating (across different APs) 5 times within 60 seconds but across different WLCs while retaining the same IP would have a value of:

$$1 \times 1 \times 10 \times (5/60) = 0.83.$$

In the above example, a user walking across a building with a mobile phone is expected to roam across APs and WLCs. The equation recognizes that situation.

When the sum of all values associated with a WLC and a set of APs are added, the result is a "heat map" of APs and WLCs that have a possible configuration problem.

Figure 7:
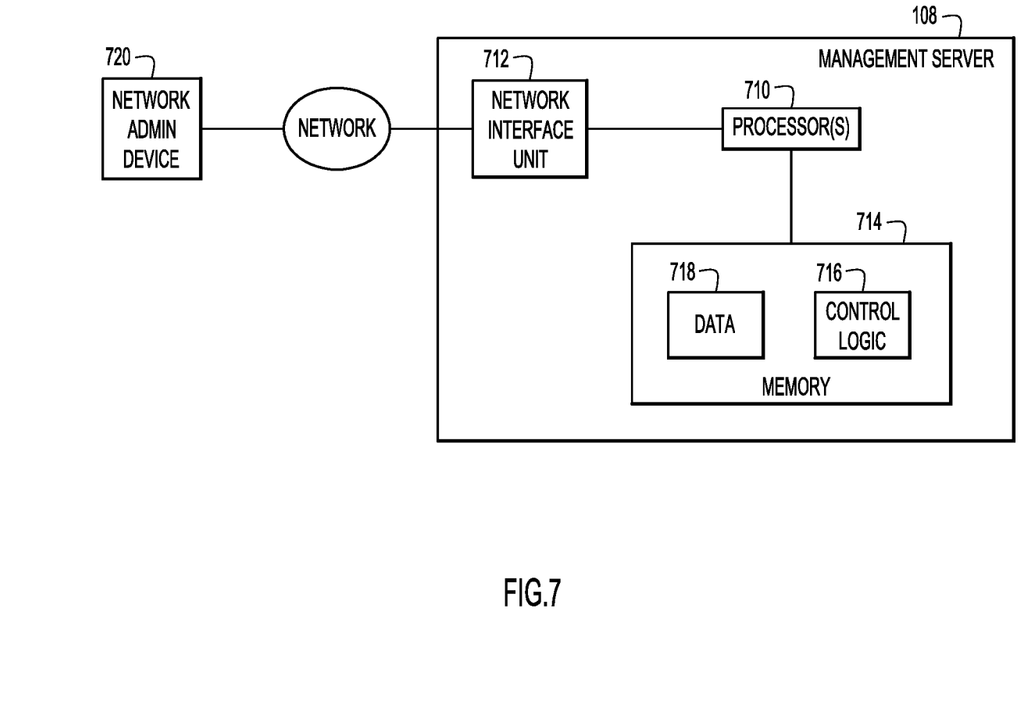
FIG. 7 is a hardware block diagram for a management server in the network that performs the methods described herein, according to an example embodiment.

With reference to FIG. 7, there is shown a hardware block diagram for management server 108. In an example, management server 108 includes a computer system, such as a server, having one or more processors 710, a network interface unit (NIU) 712, and a memory 714. Memory 714 stores control software 716 (referred as "control logic"), that when executed by the processor(s) 710, causes the computer system to perform the various operations described herein for management server 108.

The processor(s) 710 may be a microprocessor or microcontroller (or multiple instances of such components). The NIU 712 enables management entity 110 to communicate over wired connections or wirelessly with a network. NIU 712 may include, for example, an Ethernet card or other interface device having a connection port that enables management entity 110 to communicate over the network via the connection port. In a wireless embodiment, NIU 712 includes a wireless transceiver and an antenna to transmit and receive wireless communication signals to and from the network.

The memory 714 may include read only memory (ROM), random access memory (RAM), magnetic disk storage media devices, optical storage media devices, flash memory devices, electrical, optical, or other physically tangible (i.e., non-transitory) memory storage devices. Thus, in general, the memory 714 may comprise one or more tangible (non-transitory) computer readable storage media (e.g., memory device(s)) encoded with software or firmware that comprises computer executable instructions. For example, control software 716 includes logic to implement methods/operations 300 and 400, and transactions 501-516 relative to management server 108. Thus, control software 716 implements the various methods/operations described above. Control software 716 also includes logic to implement/generate for display graphical user interfaces (GUIs) as necessary in connection with the above described methods/operations.

Memory 714 also stores data 718 generated and used by control software 716, including collected event logs, weights, thresholds, and so on.

A user, such as a network administrator, may interact with management server 108, to receive reports, change algorithms, and so on, through GUIs by way of a user device 720 (also referred to as a "network administration device") that connects by way of a network with management server 108. The user device 720 may be a personal computer (laptop, desktop), tablet computer, SmartPhone, etc., with user input and output devices, such as a display, keyboard, mouse, and so on. Alternatively, the functionality and a display associated with user device 720 may be provided local to or integrated with management server 108.

In summary, embodiments presented herein analyze existing and readily available data on (or from) an authentication server to provide continuous or on-demand results showing WLCs or APs that have a roaming problem. When a wireless access request from an endpoint is authenticated, a detailed log of the event is received and stored at the authentication server. This event log contains various details such as the endpoint MAC address, MAC address of the AP, WLC IP, WLAN ID, etc. The embodiments use the data in the event log to ascertain if a WLC or an AP has a roaming configuration problem and is causing excessive authentication requests to the authentication server due to perceived roaming of the endpoint device. The embodiments have the advantage of eliminating user intensive and prolonged troubleshooting. The embodiments provide easy on-demand or continuous views of WLCs and APs with a roaming configuration problem. The embodiments further:

a. Reduce time taken to troubleshoot roaming problems;
b. Reduce or eliminate time and resources conventionally required to find network devices where roaming has not been configured properly;
c. Reduce loading on authentication servers, significantly;
d. Improve end user experience when the identified roaming problems have been fixed;
e. Increase customer satisfaction; and
f. Make it easy to focus configuration validation on a few network devices that have been identified as being improperly configured, thereby, saving resources.

In summary, in one form, a method is provided comprising: at a management server configured to communicate with an authentication server, the authentication server configured to authenticate endpoint devices configured to connect wirelessly with access points (APs) controlled by respective ones of a plurality of controllers: storing individual adjustable weights for respective ones of the APs and of the controllers; receiving from the authentication server event logs detailing requests for authentication of the endpoint devices; for each request: determining roaming conditions for the endpoint device that triggered the request based on the request and a previous request for the endpoint device; and increasing the respective weight of each of one or more of the AP connected with the endpoint device and of the controller that controls the AP by a respective amount that depends on whether the roaming conditions are caused by one or more of the AP and the controller being improperly configured to handle roaming of the endpoint device or properly configured to handle roaming of the endpoint device; and storing identities of ones of the APs and the controllers having weights that exceed one or more weight thresholds each indicative of an improperly configured AP or controller.

In another form, an apparatus is provided comprising: a network interface unit configured to communicate with an authentication server over a network, the authentication server configured to authenticate endpoint devices configured to connect wirelessly with access points (APs) controlled by respective ones of a plurality of controllers; a processor coupled to the network interface unit and configured to: store individual adjustable weights for respective ones of the APs and of the controllers; receive from the authentication server event logs detailing requests for authentication of the endpoint devices; for each request: determine roaming conditions for the endpoint device that triggered the request based on the request and a previous request for the endpoint device; and increase the respective weight of each of one or more of the AP connected with the endpoint device and of the controller that controls the AP by a respective amount that depends on whether the roaming conditions are caused by one or more of the AP and the controller being improperly configured to handle roaming of the endpoint device or properly configured to handle roaming of the endpoint device; and store identities of ones of the APs and the controllers having weights that exceed one or more weight thresholds each indicative of an improperly configured AP or controller.

In yet another form, computer readable media is provided. The computer readable media is encoded with instructions, that when executed by a processor, cause the processor to:

store individual adjustable weights for respective ones of the APs and of the controllers; receive from the authentication server event logs detailing requests for authentication of the endpoint devices; for each request: determine roaming conditions for the endpoint device that triggered the request based on the request and a previous request for the endpoint device; and increase the respective weight of each of one or more of the AP connected with the endpoint device and of the controller that controls the AP by a respective amount that depends on whether the roaming conditions are caused by one or more of the AP and the controller being improperly configured to handle roaming of the endpoint device or properly configured to handle roaming of the endpoint device; and store identities of ones of the APs and the controllers having weights that exceed one or more weight thresholds each indicative of an improperly configured AP or controller.

Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
at a management server configured to communicate with an authentication server, the authentication server configured to authenticate endpoint devices configured to connect wirelessly with access points (APs) controlled by respective ones of a plurality of controllers:
storing individual adjustable weights for respective ones of the APs and of the controllers;
receiving from the authentication server event logs detailing requests for authentication of the endpoint devices;
for each request:
determining roaming conditions for the endpoint device that triggered the request based on the request and a previous request for the endpoint device; and
increasing the respective weight of each of one or more of the APs connected with the endpoint device and of the controller that controls the AP by a respective amount that depends on whether the roaming conditions are caused by the AP and the controller being improperly configured to handle roaming of the endpoint device or properly configured to handle roaming of the endpoint device;
storing identities of ones of the APs and the controllers having weights that exceed one or more weight thresholds each indicative of an improperly configured AP or controller; and
generating a report that identifies the ones of the APs and the controllers that are improperly configured, such that the storing the individual adjustable weights, the receiving, the determining, the increasing, the storing the identities, and the generating the report, collectively, reduce time taken to troubleshoot and identify the controllers and the APs with roaming configuration problems.

2. The method of claim 1, wherein:
the determining the roaming conditions includes determining whether the endpoint device roamed between different APs based on the request and the previous request; and
the adjusting includes increasing the weight of the AP only if the endpoint device roamed between different APs.

3. The method of claim 2, wherein, if the endpoint device roamed between different APs:
the determining the roaming conditions further includes determining whether the endpoint device roamed between APs controlled by different controllers based on the request and the previous request; and
the adjusting includes increasing the weight of the controller by a first amount or a second amount that is less than the first amount if the endpoint device did not roam between APs controlled by different controllers or did roam between APs controlled by different controllers, respectively.

4. The method of claim 2, wherein, if the endpoint device roamed between different APs:
the determining further includes determining a frequency at which the endpoint device has switched between different APs and whether the frequency exceeds a threshold frequency indicative of excessive switching between different APs; and
the adjusting further includes further increasing the weight of the AP and increasing the weight of the controller that controls the AP if the frequency exceeds the threshold frequency.

5. The method of claim 2, wherein, if the endpoint device roamed between different APs:
the determining further includes determining whether the endpoint device is classified as a stationary device based on information in the event logs; and
the adjusting further includes:
if the endpoint device is classified as the stationary device, further increasing the weight of the AP and increasing the weight of the controller that controls the AP; and
if the endpoint device is not classified as the stationary device, not further increasing the weight of the AP.

6. The method of claim 1, further comprising:
prior to the storing, searching for weights that exceed the one or more weight thresholds,
wherein the storing includes storing identities of the APs and the controllers having weights found to exceed the one or more weight thresholds in the searching.

7. The method of claim 1, wherein each request identifies the endpoint device that triggered the request, the AP wirelessly connected to the endpoint device, and the controller that controls the AP, and the determining includes comparing the AP and the controller identified in the request to the AP and the controller identified in the previous request.

8. The method of claim 1, further comprising:
maintaining for each endpoint device a respective history of requests triggered by the endpoint device, the history having time-ordered entries for respective ones of the requests triggered by the endpoint device, wherein each entry is timestamped with a time when the respective request was received and includes identities of the respective AP wirelessly connected to the endpoint and the respective controller that controls the AP,
wherein the determining includes determining the roaming conditions for the endpoint device based on the information in the request and the respective history of requests maintained for the endpoint device.

9. The method of claim 8, further comprising:
receiving an indication of whether the endpoint device is classified as a stationary device or a mobile device in a profile of the endpoint device, wherein each entry in the respective history also includes the indication of whether the endpoint device is classified as a stationary device or a mobile device.

10. The method of claim 1, further comprising establishing the one or more weight thresholds, the establishing including:
setting each of the weights of the APs and of the controllers to a zero value;
performing the receiving, the determining, and the increasing over a predetermined time period in order to increase the weights over the predetermined time period; and
after the predetermined time period, determining the one or more weight thresholds each as a function of the weights as increased over the predetermined time period.

11. The method of claim 10, wherein the determining the one or more weight thresholds further includes:
searching for outliers among the weights as increased by the performing and removing the outliers found in the searching from the weights; and
determining the one or more weight thresholds as a function of the weights as increased that remain after removing the outliers.

12. The method of claim 1, wherein the controllers include wireless local area network (WLAN) controllers.

13. An apparatus comprising:
a network interface unit configured to communicate with an authentication server over a network, the authentication server configured to authenticate endpoint devices configured to connect wirelessly with access points (APs) controlled by respective ones of a plurality of controllers;
a processor coupled to the network interface unit and configured to:
store individual adjustable weights for respective ones of the APs and of the controllers;
receive from the authentication server event logs detailing requests for authentication of the endpoint devices;
for each request:
determine roaming conditions for the endpoint device that triggered the request based on the request and a previous request for the endpoint device; and
increase the respective weight of each of one or more of the APs connected with the endpoint device and of the controller that controls the AP by a respective amount that depends on whether the roaming conditions are caused by the AP and the controller being improperly configured to handle roaming of the endpoint device or properly configured to handle roaming of the endpoint device;
store identities of ones of the APs and the controllers having weights that exceed one or more weight thresholds each indicative of an improperly configured AP or controller; and
generate a report that identifies the ones of the APs and the controllers that are improperly configured, such that the operations to store the individual adjustable weights, to receive, to determine, to increase, to store the identities, and to generate the report, collectively, reduce time taken to troubleshoot and identify the controllers and the APs with roaming configuration problems.

14. The apparatus of claim 13, wherein:
the processor is configured to determine the roaming conditions by determining whether the endpoint device roamed between different APs based on the request and the previous request; and
the processor is configured to adjust by increasing the weight of the AP only if the endpoint device roamed between different APs.

15. The apparatus of claim 14, wherein, if the endpoint device roamed between different APs:
the processor is further configured to determine the roaming conditions by determining whether the endpoint device roamed between APs controlled by different controllers based on the request and the previous request; and
the processor is further configured to adjust by increasing the weight of the controller by a first amount or a second amount that is less than the first amount if the endpoint device did not roam between APs controlled by different controllers or did roam between APs controlled by different controllers, respectively.

16. The apparatus of claim 14, wherein, if the endpoint device roamed between different APs:
the processor is further configured to determine by determining a frequency at which the endpoint device has switched between different APs and whether the frequency exceeds a threshold frequency indicative of excessive switching between different APs; and
the processor is further configured to adjust by further increasing the weight of the AP and increasing the weight of the controller that controls the AP if the frequency exceeds the threshold frequency.

17. The apparatus of claim 14, wherein, if the endpoint device roamed between different APs:
the determining further includes determining whether the endpoint device is classified as a stationary device based on information in the event logs; and
the processor is further configured to adjust by:
if the endpoint device is classified as the stationary device, further increasing the weight of the AP and increasing the weight of the controller that controls the AP; and
if the endpoint device is not classified as the stationary device, not further increasing the weight of the AP.

18. A non-transitory computer readable medium encoded with instruction that, when executed by a processor of a management server configured to communicate with an authentication server, the authentication server configured to authenticate endpoint devices configured to connect wirelessly with access points (APs) controlled by respective ones of a plurality of controllers, cause the processor to:
store individual adjustable weights for respective ones of the APs and of the controllers;
receive from the authentication server event logs detailing requests for authentication of the endpoint devices;
for each request:
determine roaming conditions for the endpoint device that triggered the request based on the request and a previous request for the endpoint device; and
increase the respective weight of each of one or more of the APs connected with the endpoint device and of the controller that controls the AP by a respective amount that depends on whether the roaming conditions are caused by the AP and the controller being improperly configured to handle roaming of the endpoint device or properly configured to handle roaming of the endpoint device;

store identities of ones of the APs and the controllers having weights that exceed one or more weight thresholds each indicative of an improperly configured AP or controller; and generate a report that identifies the ones of the APs and the controllers that are improperly configured, such that the operations to store the individual adjustable weights, to receive, to determine, to increase, to store the identities, and to generate the report, collectively, reduce time taken to troubleshoot and identify the controllers and the APs with roaming configuration problems.

19. The non-transitory computer readable medium of claim 18, wherein:

the instructions to cause the processor to determine include instructions to cause the processor to determine whether the endpoint device roamed between different APs based on the request and the previous request; and the instructions to cause the processor to adjust include instructions to cause the processor to increase the weight of the AP only if the endpoint device roamed between different APs.

20. The non-transitory computer readable medium of claim 19, wherein, if the endpoint device roamed between different APs:

the instructions to cause the processor to determine include further instructions to cause the processor to determine whether the endpoint device roamed between APs controlled by different controllers based on the request and the previous request; and the instructions to cause the processor to adjust include further instructions to cause the processor to increase the weight of the controller by a first amount or a second amount that is less than the first amount if the endpoint device did not roam between APs controlled by different controllers or did roam between APs controlled by different controllers, respectively.

* * * * *